United States Patent
Liu et al.

(10) Patent No.: US 10,486,287 B2
(45) Date of Patent: Nov. 26, 2019

(54) WHEEL BLANK POSITIONING LIP CORRECTION DEVICE

(71) Applicant: CITIC Dicastal CO.,LTD, Qinhuangdao (CN)

(72) Inventors: Huiying Liu, Qinhuangdao (CN); Yuexin Lu, Qinhuangdao (CN); Zhiyuan Yu, Qinhuangdao (CN)

(73) Assignee: CITIC DICASTAL CO., LTD, Qinhuangdao, Hebei (CN)

(*) Notice: Subject to any disclaimer, the term of this patent is extended or adjusted under 35 U.S.C. 154(b) by 128 days.

(21) Appl. No.: 15/801,994

(22) Filed: Nov. 2, 2017

(65) Prior Publication Data
US 2019/0022823 A1 Jan. 24, 2019

(30) Foreign Application Priority Data
Jul. 21, 2017 (CN) .......................... 2017 1 05982749

(51) Int. Cl.
*B24B 9/04* (2006.01)
*B24B 5/44* (2006.01)
(Continued)

(52) U.S. Cl.
CPC ................ *B24B 49/12* (2013.01); *B24B 5/44* (2013.01); *B24B 9/04* (2013.01); *B24B 27/0023* (2013.01);
(Continued)

(58) Field of Classification Search
CPC .... B24B 5/44; B24B 9/02; B24B 9/04; B24B 19/00; B24B 21/02; B24B 21/12;
(Continued)

(56) References Cited

U.S. PATENT DOCUMENTS 3,258,804 A * 7/1966 Fowle .................... B24B 5/225
15/104.011
4,216,560 A * 8/1980 Schmidt ................. B24B 41/06
15/268
(Continued)

FOREIGN PATENT DOCUMENTS

GB      667407 A * 2/1952 ............... B24B 5/44
JP    3044289 B2 * 5/2000
JP    3091417 B2 * 9/2000

*Primary Examiner* — Eileen P Morgan
(74) *Attorney, Agent, or Firm* — Calfee, Halter & Griswold LLP

(57) ABSTRACT

Wheel blank positioning lip correction device comprises an end mill and a grinding wheel, etc. The first linear motor is mounted at the upper part of the frame, which controls lifting of the feeding slide plate. Output end of the second linear motor is connected with the inner slide block. The second servo motor is mounted on the inner slide block, the end mill is mounted at output end of the second servo motor. The lifting linear motor is fixed on the motor support plate, which controls lifting of the lifting table. Output end of the third linear motor is connected with the outer slide block. The third servo motor is mounted on the outer slide block, which controls rotation of the grinding wheel. The end mill and the grinding wheel are used for correcting the axial positioning surface and the radial positioning surface of the positioning lip respectively.

1 Claim, 3 Drawing Sheets

(51) Int. Cl.
  *B24B 49/12*   (2006.01)
  *B24B 29/00*   (2006.01)
  *B24B 27/00*   (2006.01)

(52) U.S. Cl.
  CPC ........ *B24B 27/0076* (2013.01); *B24B 29/005* (2013.01)

(58) Field of Classification Search
  CPC ..... B24B 21/16; B24B 19/28; B24B 27/0076; B24B 27/0023; B24B 29/00; B24B 29/005; B24B 49/12
  USPC .................................................. 451/65, 194
  See application file for complete search history.

(56) References Cited

U.S. PATENT DOCUMENTS

| | | | | |
|---|---|---|---|---|
| 5,134,807 | A * | 8/1992 | Keefe | B24B 7/16 451/259 |
| 5,161,281 | A * | 11/1992 | Hanen | B08B 1/04 15/88.3 |
| 5,762,542 | A * | 6/1998 | Sandvold | B24B 9/002 451/188 |
| 2007/0037497 | A1* | 2/2007 | Tanaka | B24B 5/44 451/312 |
| 2007/0042678 | A1* | 2/2007 | Tanaka | B24B 5/44 451/5 |
| 2013/0102233 | A1* | 4/2013 | Cheon | B24B 27/033 451/331 |

* cited by examiner

WHEEL BLANK POSITIONING LIP CORRECTION DEVICE

CROSS-REFERENCE TO RELATED APPLICATIONS

This application claims priority to Chinese Patent Application No. 201710598274.9, filed on Jul. 21, 2017, which is hereby incorporated by reference in its entirety.

TECHNICAL FIELD

The present application relates to the technical field of wheel blank positioning lip correction, specifically to a deformation correction device for the positioning lip of a wheel blank.

BACKGROUND ART

Adopted in positioning during aluminum alloy wheel machining is a cast process lip, and the cast blank deforms in the cooling process and after thermal treatment, so that the axial positioning surface and radial positioning surface of the cast process lip are raised and sunken. When the axial positioning surface and radial positioning surface of the cast process lip deform greatly, the machined and clamped wheel skews, and the machined product has the defects of skewing, machining failure of inner and outer rims and the like.

SUMMARY OF THE INVENTION

The aim of the present application is to provide a deformation correction device for the positioning lip of a wheel blank. The device is used for solving the problem of machining rejects caused by deformation of the positioning lip of the wheel blank. The device can correct the deformation of the positioning lip and prevent unqualified blanks from being machined.

In order to fulfill the above aim, the present application adopts the following technical solution: A wheel blank positioning lip correction device comprises a frame, a gear rack structure, a first guide rail, a clamping system support plate, a first servo motor, a first slide plate, a clamping cylinder, a rotating shaft, rotating wheels, an end mill, guide posts, a second servo motor, an inner slide block, a second guide rail, a feeding slide plate, a second linear motor, a first linear motor, a third servo motor, a shaft, a grinding wheel, an outer slide block, a third guide rail, a third linear motor, a lifting table, a second slide plate, a lifting guide rail, a motor support plate and a lifting linear motor.

The first guide rail is mounted on the clamping system support plate, the first slide plate and the second slide plate are mounted on the first guide rail and connected with each other via the gear rack structure, four rotating wheels are symmetrically mounted on the first slide plate and the second slide plate, one of the four rotating wheels is driven by the first servo motor, and the remaining three of the four rotating wheels can rotate freely via shaft and bearing structures; when the clamping cylinder drives the first slide plate to move, the second slide plate moves synchronously with the first slide plate to clamp a wheel, and the first servo motor drives the rotating wheel to rotate via the rotating shaft, so that the clamped wheel can rotate at a low speed.

The four guide posts are fixed at the top of the frame, the first linear motor is mounted at the upper part of the frame, the output end of the first linear motor is connected with the feeding slide plate, the first linear motor controls lifting of the feeding slide plate under the guiding effect of the guide posts, the second guide rail and the second linear motor are fixed on the feeding slide plate, the inner slide block is mounted on the second guide rail, and the output end of the second linear motor is connected with the inner slide block and can control motion of the inner slide block in the horizontal direction. The second servo motor is mounted on the inner slide block, the end mill is mounted at the output end of the second servo motor, and the end mill is used for milling and correcting the axial positioning surface of the positioning lip. When the outside diameter of the wheel is changed, the second linear motor can drive the inner slide block to move horizontally so as to adjust the end mill to be located above the positioning lip.

Both the lifting guide rail and the motor support plate are mounted on the side of the frame, the lifting linear motor is fixed on the motor support plate, and the output end of the lifting linear motor is connected with the lifting table and controls ascending and descending of the lifting table. Both the third guide rail and the third linear motor are fixed on the lifting table, the outer slide block is mounted on the third guide rail, and the output end of the third linear motor is connected with the outer slide block and controls horizontal feeding of the outer slide block. The third servo motor is mounted on the outer slide block, the third servo motor controls rotation of the grinding wheel via the shaft, the taper of the grinding wheel is kept consistent with the slope of the radial positioning surface, and the grinding wheel is used for grinding and correcting the radial positioning surface of the positioning lip. When the width of the wheel is changed, the lifting linear motor can drive the lifting table to move up and down so as to adjust the grinding wheel to arm at the radial positioning surface of the positioning lip.

The working process of the wheel blank positioning lip correction device is as follows: firstly, the positions of the end mill and the grinding wheel are adjusted according to the outside diameter and width information of a wheel, so that the end mill is located above the positioning lip, and the grinding wheel arms at the radial positioning surface of the positioning lip; after feeding on a roller bed, the clamping cylinder is started to drive the rotating wheels to clamp the wheel; then the first linear motor is started to drive the feeding slide plate to descend, the second servo motor drives the end mill to rotate, and the end mill begins milling correction when contacting the axial positioning surface of the positioning lip; when the feeding slide plate descends, the third linear motor is started to drive the outer slide block to be fed horizontally, the third servo motor drives the grinding wheel to rotate, and the grinding wheel begins grinding correction when contacting the radial positioning surface of the positioning lip; after the end mill and the grinding wheel move in place, the first servo motor is started to drive the wheel to rotate at a low speed, and correction is completed after the wheel rotates one circle. Finally, the end mill and the grinding wheel are reset, the wheel is loosened, and the roller bed brings the wheel to next procedure, and so on.

The device is reasonable in layout, flexible and efficient; the two positioning surfaces to be corrected are separated into two stations, so that the interference of cutter concentration is avoided; and through simultaneous correction at the two stations, the production efficiency is high. Besides, the device is high in flexibility and strong in generality, and can be used for correcting wheels having different outside diameters and different widths.

The present application may solve the problem of machining rejects caused by deformation of the positioning lip of the wheel blank, reduce the manufacturing cost and improve the qualification rate of the product; and the device is simple in operation, efficient and practical, and meets automatic continuous production.

Figure 1:
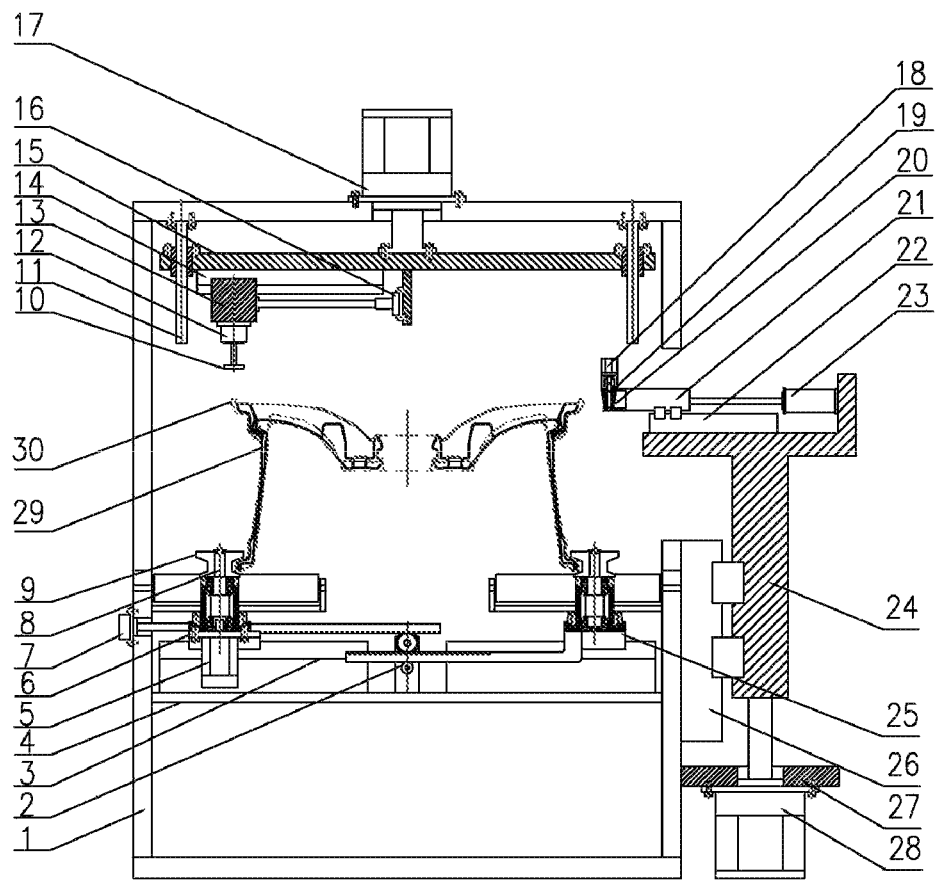
FIG. 1 is a front view of a wheel blank positioning lip correction device of the present application.
Figure 2:
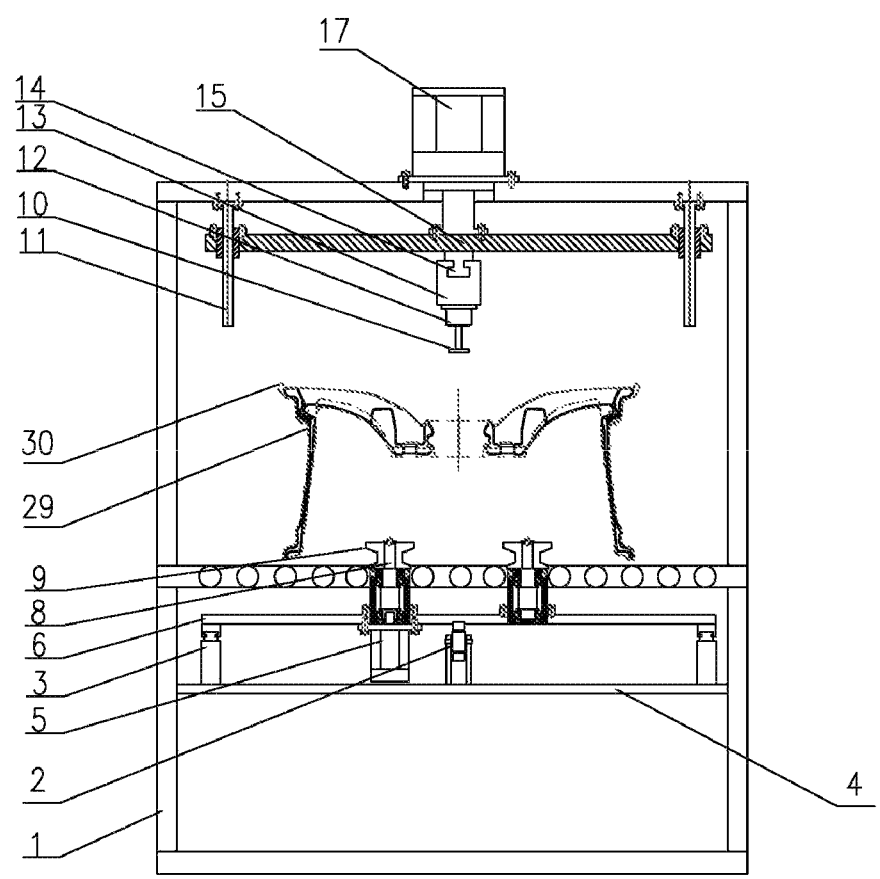
FIG. 2 is a left view of the wheel blank positioning lip correction device of the present application.
Figure 3:
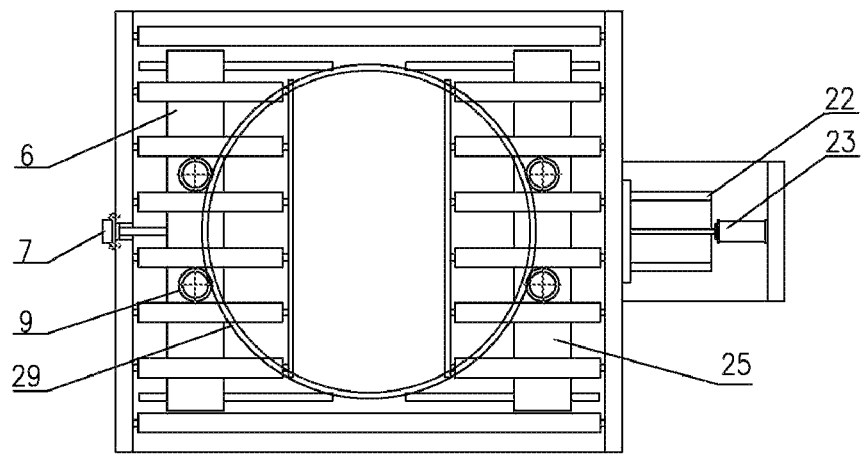
FIG. 3 is a top view of the wheel blank positioning lip correction device of the present application.

In figures: 1—frame, 2—gear rack structure, 3—first guide rail, 4—clamping system support plate, 5—first servo motor, 6—first slide plate, 7—clamping cylinder, 8—rotating shaft, 9—rotating wheel, 10—end mill, 11—guide post, 12—second servo motor, 13—inner slide block, 14—second guide rail, 15—feeding slide plate, 16—second linear motor, 17—first linear motor, 18—third servo motor, 19—shaft, 20—grinding wheel, 21—outer slide block, 22—third guide rail, 23—third linear motor, 24—lifting table, 25—second slide plate, 26—lifting guide rail, 27—motor support plate, 28—lifting linear motor, 29—wheel blank, 30—positioning lip.

DETAILED DESCRIPTION OF THE INVENTION

Details and working conditions of a specific device provided by the present application will be given below in combination with the accompanying drawings.

A wheel blank 29 positioning lip 30 correction device comprises a frame 1, a gear rack structure 2, a first guide rail 3, a clamping system support plate 4, a first servo motor 5, a first slide plate 6, a clamping cylinder 7, a rotating shaft 8, rotating wheels 9, an end mill 10, guide posts 11, a second servo motor 12, an inner slide block 13, a second guide rail 14, a feeding slide plate 15, a second linear motor 16, a first linear motor 17, a third servo motor 18, a shaft 19, a grinding wheel 20, an outer slide block 21, a third guide rail 22, a third linear motor 23, a lifting table 24, a second slide plate 25, a lifting guide rail 26, a motor support plate 27 and a lifting linear motor 28.

The first guide rail 3 is mounted on the clamping system support plate 4, the first slide plate 6 and the second slide plate 25 are mounted on the first guide rail 3 and connected with each other via the gear rack structure 2, four rotating wheels 9 are symmetrically mounted on the first slide plate 6 and the second slide plate 25, one of the four rotating wheels 9 is driven by the first servo motor 5, and the remaining three of the four rotating wheels 9 can rotate freely via shaft and bearing structures; when the clamping cylinder 7 drives the first slide plate 6 to move, the second slide plate 25 moves synchronously with the first slide plate 6 to clamp a wheel, and the first servo motor 5 drives the rotating wheel 9 to rotate via the rotating shaft 8, so that the clamped wheel can rotate at a low speed.

The four guide posts 11 are fixed at the top of the frame 1, the first linear motor 17 is mounted at the upper part of the frame 1, the output end of the first linear motor 17 is connected with the feeding slide plate 15, the first linear motor 17 controls lifting of the feeding slide plate 15 under the guiding effect of the guide posts 11, the second guide rail 14 and the second linear motor 16 are fixed on the feeding slide plate 15, the inner slide block 13 is mounted on the second guide rail 14, and the output end of the second linear motor 16 is connected with the inner slide block 13 and can control motion of the inner slide block 13 in the horizontal direction. The second servo motor 12 is mounted on the inner slide block 13, the end mill 10 is mounted at the output end of the second servo motor 12, and the end mill 10 is used for milling and correcting the axial positioning surface of the positioning lip 30. When the outside diameter of the wheel is changed, the second linear motor 16 can drive the inner slide block 13 to move horizontally so as to adjust the end mill 10 to be located above the positioning lip 30.

Both the lifting guide rail 26 and the motor support plate 27 are mounted on the side of the frame 1, the lifting linear motor 28 is fixed on the motor support plate 27, and the output end of the lifting linear motor 28 is connected with the lifting table 24 and controls ascending and descending of the lifting table 24. Both the third guide rail 22 and the third linear motor 23 are fixed on the lifting table 24, the outer slide block 21 is mounted on the third guide rail 22, and the output end of the third linear motor 23 is connected with the outer slide block 21 and controls horizontal feeding of the outer slide block 21. The third servo motor 18 is mounted on the outer slide block 21, the third servo motor 18 controls rotation of the grinding wheel 20 via the shaft 19, the taper of the grinding wheel 20 is kept consistent with the slope of the radial positioning surface, and the grinding wheel 20 is used for grinding and correcting the radial positioning surface of the positioning lip 30. When the width of the wheel is changed, the lifting linear motor 28 can drive the lifting table 24 to move up and down so as to adjust the grinding wheel 20 to arm at the radial positioning surface of the positioning lip 30.

The working process of the wheel blank positioning lip 30 correction device is as follows: firstly, the positions of the end mill 10 and the grinding wheel 20 are adjusted according to the outside diameter and width information of a wheel, so that the end mill 10 is located above the positioning lip 30, and the grinding wheel 20 arms at the radial positioning surface of the positioning lip 30; after feeding on a roller bed, the clamping cylinder 7 is started to drive the rotating wheels 9 to clamp the wheel; then the first linear motor 17 is started to drive the feeding slide plate 15 to descend, the second servo motor 12 drives the end mill 10 to rotate, and the end mill 10 begins milling correction when contacting the axial positioning surface of the positioning lip 30; when the feeding slide plate 15 descends, the third linear motor 23 is started to drive the outer slide block 21 to be fed horizontally, the third servo motor 18 drives the grinding wheel 20 to rotate, and the grinding wheel 20 begins grinding correction when contacting the radial positioning surface of the positioning lip 30; after the end mill 10 and the grinding wheel 20 move in place, the first servo motor 5 is started to drive the wheel to rotate at a low speed, and correction is completed after the wheel rotates one circle. Finally, the end mill 10 and the grinding wheel 20 are reset, the wheel is loosened, and the roller bed brings the wheel to next procedure, and so on.

The device is reasonable in layout, flexible and efficient; the two positioning surfaces to be corrected are separated into two stations, so that the interference of cutter concentration is avoided; and through simultaneous correction at the two stations, the production efficiency is high. Besides, the device is high in flexibility and strong in generality, and can be used for correcting wheels having different outside diameters and different widths.

The present application may solve the problem of machining rejects caused by deformation of the positioning lip of the wheel blank, reduce the manufacturing cost and improve the qualification rate of the product; and the device is simple in operation, efficient and practical, and meets automatic continuous production.

The foregoing descriptions of specific exemplary embodiments of the present application have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present application, as well as various alternatives and modifications thereof. It is intended that the scope of the invention be defined by the Claims appended hereto and their equivalents.

What is claimed is:

1. A wheel blank positioning lip correction device, comprising a frame, a gear rack structure, a first guide rail, a clamping system support plate, a first servo motor, a first slide plate, a clamping cylinder, a rotating shaft, rotating wheels, an end mill, guide posts, a second servo motor, an inner slide block, a second guide rail, a feeding slide plate, a second linear motor, a first linear motor, a third servo motor, a shaft, a grinding wheel, an outer slide block, a third guide rail, a third linear motor, a lifting table, a second slide plate, a lifting guide rail, a motor support plate and a lifting linear motor, wherein the four guide posts are fixed at the top of the frame, the first linear motor is mounted at the upper part of the frame, an output end of the first linear motor is connected with the feeding slide plate, the first linear motor controls lifting of the feeding slide plate under the guiding effect of the guide posts, the second guide rail and the second linear motor are fixed on the feeding slide plate, the inner slide block is mounted on the second guide rail, and an output end of the second linear motor is connected with the inner slide block and is configured to control motion of the inner slide block in the horizontal direction; the second servo motor is mounted on the inner slide block, the end mill is mounted at an output end of the second servo motor, and the end mill is used for milling and correcting the axial positioning surface of the positioning lip; and when the outside diameter of the wheel is changed, the second linear motor is configured to drive the inner slide block to move horizontally so as to adjust the end mill to be located above the positioning lip;

both the lifting guide rail and the motor support plate are mounted on the side of the frame, the lifting linear motor is fixed on the motor support plate, and an output end of the lifting linear motor is connected with the lifting table and controls ascending and descending of the lifting table; both the third guide rail and the third linear motor are fixed on the lifting table, the outer slide block is mounted on the third guide rail, and an output end of the third linear motor is connected with the outer slide block and controls horizontal feeding of the outer slide block; the third servo motor is mounted on the outer slide block, the third servo motor controls rotation of the grinding wheel via the shaft, the taper of the grinding wheel is kept consistent with the slope of the radial positioning surface, and the grinding wheel is used for grinding and correcting the radial positioning surface of the positioning lip; and when the width of the wheel is changed, the lifting linear motor is configured to drive the lifting table to move up and down so as to adjust the grinding wheel to arm at the radial positioning surface of the positioning lip;

the working process of the wheel blank positioning lip correction device is as follows: firstly, the positions of the end mill and the grinding wheel are adjusted according to the outside diameter and width information of a wheel, so that the end mill is located above the positioning lip, and the grinding wheel arms at the radial positioning surface of the positioning lip; after feeding on a roller bed, the clamping cylinder is started to drive the rotating wheels to clamp the wheel; then the first linear motor is started to drive the feeding slide plate to descend, the second servo motor drives the end mill to rotate, and the end mill begins milling correction when contacting the axial positioning surface of the positioning lip; when the feeding slide plate descends, the third linear motor is started to drive the outer slide block to be fed horizontally, the third servo motor drives the grinding wheel to rotate, and the grinding wheel begins grinding correction when contacting the radial positioning surface of the positioning lip; after the end mill and the grinding wheel move in place, the first servo motor is started to drive the wheel to rotate at a low speed, and correction is completed after the wheel rotates one circle, wherein, the end mill and the grinding wheel are reset, the wheel is loosened, and the roller bed brings the wheel to next procedure.

* * * * *